Figure 1:
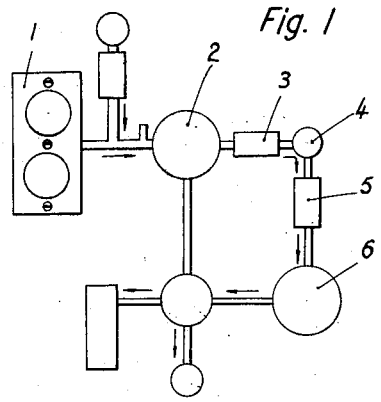

June 22, 1926.

L. A. AGOPIAN

APPARATUS FOR OBTAINING VITAMINES

Filed Feb. 20, 1923

1,589,504

INVENTOR

Livon Arakel Agopian by Chas J. O'Neill

ATTORNEY

Patented June 22, 1926.

1,589,504

UNITED STATES PATENT OFFICE.

LEVON ARAKEL AGOPIAN, OF PARIS, FRANCE.

APPARATUS FOR OBTAINING VITAMINES.

Application filed February 20, 1923, Serial No. 620,308, and in France February 23, 1922.

The present invention has for its object improvements and modifications in the process forming the subject matter of my prior patent application filed the 29th day of August 1921, Serial Nr. 496,611.

It has been proposed, first of all, to improve, from certain points of view, the mode of operation and the apparatus which is to be employed to obtain the C or antiscorbutic vitamine according to the principal patent.

In the second place I have been compelled to render more precise the conditions under which the treatment of the juices extracted from vegetables allows other varieties of vitamines to be obtained; in particular the vitamine which is designated by the letter A, or by the name of "growth promoting factor".

One modification in the process described in the principal patent for obtaining the antiscorbutic vitamine consists in substituting for the neutral salts of lead, mercury, etc., for the treatment of the juices extracted from vegetables, certain free acids, such as citric, tartaric or acetic acid.

When the first two of these acids are used, they are converted into the solid state and the vegetables (peas for example) to be treated are dusted therewith before undergoing any other operation. Only after this dusting are the vegetables subjected to crushing and the juice obtained is thus all combined with the necessary acid. This acid must be used in such quantity that a proportion varying from 0,6 to 0,7 per cent thereof, ascertainable by titration, is present in the juices extracted from the vegetables by crushing.

This mode of using citric and tartaric acids seems to be particularly advantageous for vegetables which contain very active oxidizing ferments, such as potatoes. The extraction of the juice when conducted in the presence of citric and tartaric acids permits the vitamines to be extracted therefrom without loss.

When acetic acid is employed, the mode of operation is slightly different.

The juice is extracted from peas by crushing, before the addition of the acid. This latter is afterwards incorporated therewith up to a proportion of 1 per cent.

This use of acetic acid simplifies the operations and permits vitaminic preparations which possess a marked physiological action to be rapidly obtained.

It must be quite understood that the treatments just described only modify in the whole of the process the first reaction carried out on the juices of the vegetables. The remainder of the subsequent operations are carried out, without its being necessary to revert thereto, exactly as in the principal patent.

Another improvement in the carrying out of the process forming the subject matter of the principal patent consists in a slight modification in the mode of use of the Soxhlet apparatus in which the vitamine is extracted from the powder which results from the previous treatments and constitutes the first final material and also in the desiccating and packing apparatus.

Figure 2:
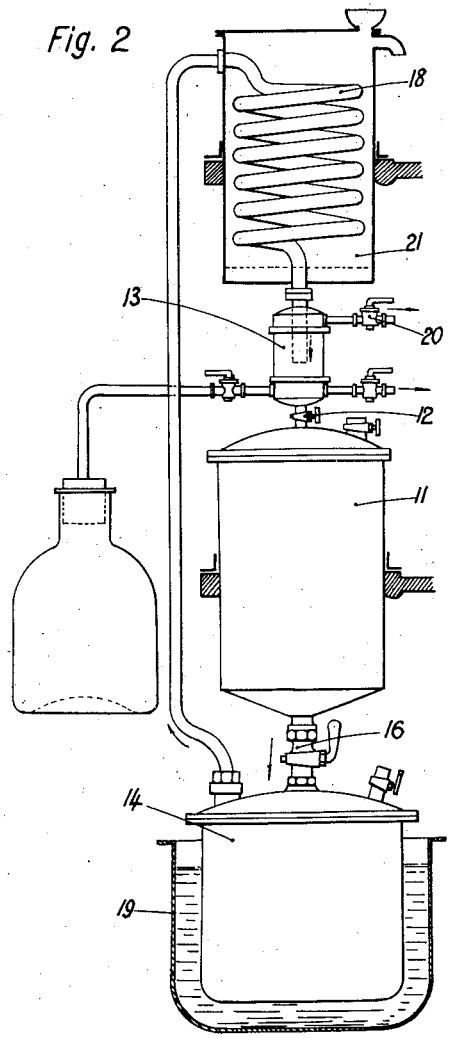
Figure 3:
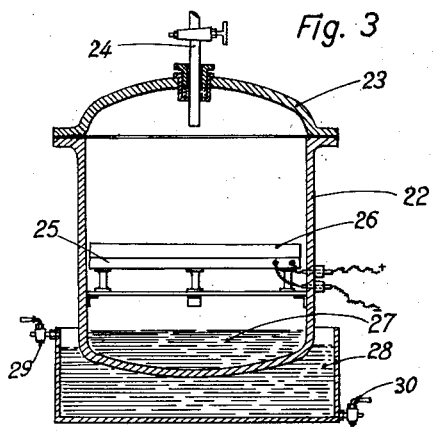
Figure 4:
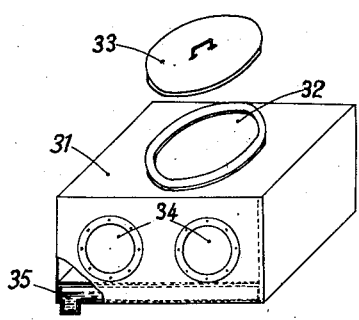

In the accompanying drawings, Fig. 1 shows the general apparatus for preparing raw materials for treatment, Fig. 2 shows the apparatus for extracting the vitamines, Fig. 3 shows an improved desiccator, and Fig. 4 shows a packing device for the finished product.

The principal patent states that in order to extract the material in the Soxhlet apparatus (see Figure 2) it is subjected to the action of a suitable solvent, such as ethyl alcohol or glycerine. The mode of operation was principally devised for a solvent boiling in vacuo such as ethyl alcohol and the powder to be extracted was placed in the extraction shell 11 of the Soxhlet apparatus.

The modification aimed at by the present addition relates to cases where use is made of a solvent such as glycerine which does not boil in a vacuum at the temperature indicated.

Under these conditions, the material to be extracted is placed, not in the extraction shell 11, but in the vessel 14. The whole of the interior of the Soxhlet apparatus is filled with anhydrous glycerine.

The glycerine circulates in a closed cycle maintained at a temperature between 30 and 35 degrees C. in the vessel 14 and is cooled below 0 degree C. by the coil 18 occupying the upper part of the Soxhlet.

The powder, which is placed in a bag or filter paper in the vessel 14, is directed by the glycerine maintained between 30 and 35° C.

The difference of density between the glycerine heated to between 30 and 35° C. in the vessel 14 and that cooled below 0° in the coil 18 sets up a continuous circulation.

The glycerine passing from the vessel 14 in which it is at a temperature between 30 and 35° C. through the large goose neck of the apparatus into the coil cooled to a temperature below 0° C. descends again into the vessel 14 passing through the washed (vessel 11). At the bottom of this latter is placed a paper filter which is thus situated in the path of the glycerine between the coil in which it is to be cooled down and the vessel 14 into which it descends by virtue of its increased density.

The glycerine in the vessel 14 is saturated by the crude product at the temperature of 35° C. When cooled down to 0° C. it deposits a portion of the substances which it contains. This deposit (precipitate) is intercepted by the paper filter of the vessel 11.

By repeating these operations it is possible to fractionate the crude product dissolved in the glycerine and to obtain the separation of the C or antiscorbutic vitamine in a crystalline form, chemically pure and free from different impurities which accompany it still in the crude product.

Finally it is possible, by suitably conducting the course of operations, to collect the A or growth factor, vitamine, soluble in fats.

The following are used as raw materials:
(a) The juices of vegetables extracted by hydraulic pressure.
(b) The marc or residue left after pressure.

When the juices of vegetables are treated the organic acids hereinbefore mentioned, viz, citric, tartaric or acetic acids are used as reagents.

Referring to Figure 1 of the drawing, the juice obtained by the action of the hydraulic press 1 is collected in the first autoclave 2, in which it is subjected to the reaction of the reagent, then according to the process described in the principal patent, it passes into a first filter press 3 and so on until it reaches the second autoclave 6. The residue from the evaporation which is produced therein is treated by a suitable solvent in the Soxhlet apparatus.

The solvents employed in this case are benzol, commercial petroleum ether, rectified petroleum ether, ethyl ether, acetic ether, acetone, chloroform. If the residue subjected to extraction contains more than 10 per cent of water, the action of the solvents just enumerated is preceded by an extraction with ethyl or methyl alcohol at 98° C.

After the termination of the extraction and distillation of the solvent employed, the preparation assumes the form of a greenish yellow, orange or red coloured oil.

It is decolorized by the usual treatment with animal charcoal.

The product thus obtained presents all the properties of the growth factor, A vitamine, soluble in fats.

When the marc or residue remaining after the extraction of the juice in the hydraulic press is used to obtain the product, the mode of operation is as follows:

Rapid desiccation is carried out at a temperature varying between 20 and 30° C. in vacuo, in the presence of sulphuric acid. The dried mass is ground into fine powder and extracted in the Soxhlet, as just described above for the product resulting from the action of the organic acids on the juices of vegetables.

To carry out the desiccation defined above I used an apparatus shown in section in Figure 3 and heated electrically.

This apparatus comprises a cylindrical receptacle 22, of suitable material, closed by a cover 23; a connection 24, passing through the cover, puts the receptacle into communication with an apparatus for producing a vacuum.

In the interior of this receptacle is arranged, on suitable supports, an electric heating resistance 25, serving as a carrier, on which the products to be dried are placed at 26. In the bottom of the apparatus a certain quantity of sulphuric acid, indicated by 27, completes the outfit. The lower part of the receptacle dips into a tank 28, in which a current of cooling water is set up, the water entering by the cock 29 and leaving by the cock 30.

The products finally obtained may, in certain cases, be strongly hygroscopic, which will necessitate certain precautions being taken as regards their packing. The apparatus illustrated in perspective view, Figure 4, partly broken away, allows packing to be carried out with perfect security in these cases. It is formed by a rectangular box 31 at the upper part of which is provided a sight hole 32 which may be closed by a cover 33 if desired. On one of the sides are cut out two entrances 34 for fore arms forming rubber gloves.

At the lower part of the box is a tray of lead 35 in which sulphuric acid is placed in order to absorb moisture. The manipulations necessitated by the packing may then be carried out in a dry atmosphere the hands of the operator being gloved in rubber.

Claims:

1. Means for desiccating vitamines containing material comprising a closed receptacle containing a body of sulphuric acid, means for exhausting air from said receptacle, means for supporting the material above the acid, and means for heating the supporting means.

2. Means for desiccating vitamines containing material comprising a closed receptacle containing a body of sulphuric acid, means for exhausting air from said receptacle, a table-like support for the material above the acid, and an electrial heater associated with said support.

3. Means for desiccating vitamen containing material comprising a closed receptacle containing a body of sulphuric acid, means for exhausting air from said receptacle, a table-like support for the material above the acid, an electrical heater associated with said support, and a cooling tank in which the lower part of the receptacle is submerged.

In testimony whereof I affix my signature.

LEVON ARAKEL AGOPIAN.